Figure 1:
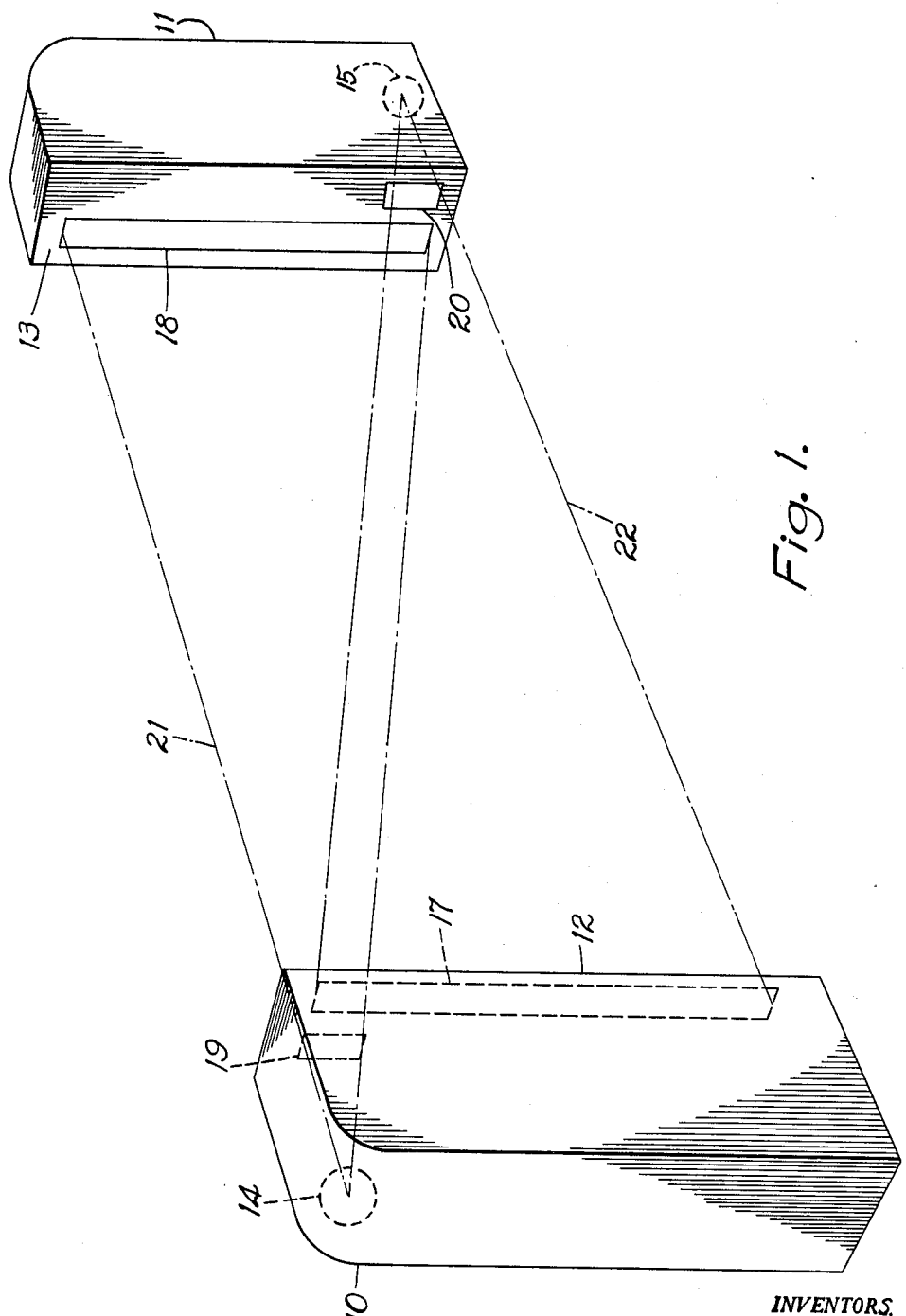

Feb. 15, 1966  D. E. KRESS ETAL  3,235,738
PHOTOELECTRIC APPARATUS FOR DETECTING OBJECTS IN AN AREA
Filed May 14, 1962  2 Sheets-Sheet 1

INVENTORS.
Donald E. Kress & Donald J. Baker
BY

Christel & Bean
ATTORNEYS

INVENTORS.
Donald E. Kress & Donald J. Baker
BY
Christel & Bean
ATTORNEYS.

United States Patent Office 3,235,738
Patented Feb. 15, 1966

3,235,738
PHOTOELECTRIC APPARATUS FOR DETECTING OBJECTS IN AN AREA
Donald E. Kress, Buffalo, and Donald J. Baker, Williamsville, N.Y., assignors to Sensi-Tronics, Inc., Buffalo, N.Y.
Filed May 14, 1962, Ser. No. 194,330
5 Claims. (Cl. 250—221)

This invention relates to photo-sensitive detection apparatus and more particularly to apparatus which is capable of sensing the presence of objects anywhere in an area of substantial length and width.

In the most common forms of photo-sensitive detection apparatus a single beam or pencil of light traverses an area from a point source of light to a photocell which presents a relatively small light receiving target. Apparatus of this type is satisfactory where the objects to be sensed are of such extent that they are certain to intersect the pencil of light. This prior art apparatus is also capable of being used with small objects when the objects move along a clearly defined narrow path so that the objects are accurately oriented to intersect a relatively narrow beam or pencil of light.

A special problem exists when the area through which objects may pass is of a substantial two-dimensional extent, for instance a rectangular area of a given length measured from the light source to the light sensitive means and of a substantial width or height in a direction at right angles thereto. This problem is presented, for instance, when the objects pass more or less at random through the critical area instead of along an accurately defined recurring path, so that objects could pass through the area without intersecting the conventional concentrated light beam ordinarily employed for these purposes.

In the case of such a rectangular area, if objects of relatively small compass are to be detected as they pass through any part of the area, special light sensitive means and special light emitting means would normally be required to blanket the critical area. Even then results would not be too reliable due to stray light and interference from light beams closely adjacent to the passing object.

One theoretically possible method for rendering such a rectangular area light sensitive throughout its two-dimensional extent would be to provide a sheet of light across the area either by employing a series of separate light projecting devices or by providing refraction means or other means for collimating the light. Of course the collimating means must be of such design as to project collimated light rays from substantially all points along the side of the rectangular field from which the light emanates.

Similarly, at the detection side of the rectangular field, this possible approach to the present problem would require a series of photocells in order to respond to interruptions of any portion of the collimated light which passes across the rectangular field. In effect this theoretical approach to the present problem amounts to a multiplicity of individual light sensitive arrangements of the pencil beam type referred to earlier herein used side by side to blanket a desired area. The necessity for multiple light sources or complicated refraction or other collimating means, together with the requirement for multiple photocells, would render apparatus of this type very complicated, proportionately expensive, and also proportionately subject to failure of any individual component of the apparatus.

The present invention provides a photo-sensitive detection arrangement wherein a rectangular field of substantially two-dimensional extent is rendered photo-sensitive as to all parts of its area so that a relatively small object passing anywhere therethrough is effectively detected. In the arrangement of the present invention the illuminating means is extremely simple, requiring no refraction or collimating means and in fact not even requiring the usual condensing lens employed with detection devices which use only a single beam of light. Furthermore, the detection arrangement is also simple and accordingly relatively free from troublesome failures of components.

Speaking very generally, the arrangement of the present invention comprises the employment of two elongated strips of photo-sensitive material, each of a length approximately equal to the height of the rectangular field which is to be rendered photo-sensitive. One of these strips is arranged along each of two opposite side edges of the rectangular field and the strips may be connected in series.

The strips are of such nature that, the two strips being normally illuminated throughout their effective lengths, an object casting a shadow or darkened area across any portion of either of the two strips increases the over-all resistance of the strips. This increase of resistance is suitably amplified and employed in any desired manner such as to control the operation of a machine with which the apparatus is associated or effect any other positive or negative control impulse or operation.

The means for illuminating the rectangular area is novel both in itself and in combination with the aforementioned elongated photo-sensitive strips. Two light sources are employed each of which may be an ordinary incandescent lamp which may be considered as a point source of light even though its filament is of some small extent. Light rays from the two lamps radiate in the usual manner.

One of these light sources is located adjacent to the end of each of the two strips with the two light sources at diagonally opposite corners of the rectangular field. The light sources are housed so that light from each source emanates in a radiating triangular pattern whereby the two light sources each provide an illuminated area in the general shape of a right triangle, the two right triangles being approximately coincident along their hypotenuses and so disposed that together they blanket the desired rectangular area. In practice the two triangular light patterns preferably overlap to insure complete coverage.

No optical refracting or reflecting means of any kind are required or are contemplated in the embodiment set forth herein by way of example. Reflectors may be employed in the lamp housings to direct stray light into the desired rectangular pattern to improve the efficiency of use of the available light but the use of such reflectors is strictly optional and not required for general purposes.

The use of an elongated strip of material along a side of a given field or area for illumination by light passing across such area, the strip being of a character to exhibit a change in electrical resistance upon darkening of any portion of the length of the strip, is believed to be novel in and of itself as well as in combination with the novel illuminating means referred to generally above. That is, the photo-sensitive elongated strip component of the present invention might be illuminated across the sensitive field or area by collimated light or other illuminating means, although the full benefits of the present invention are attained by employing the elongated photo-sensitive strips in conjunction with the simple light radiating arrangement referred to above and described more fully in the following specification.

A preferred embodiment of the principles of the present invention is illustrated somewhat schematically in the accompanying drawings and is described in the following specification. However, it is to be understood that this embodiment is set forth to illustrate the principles of the invention and that numerous modifications and variations may be made without departing from the spirit of the invention, the scope of which is limited only as defined in the appended claims.

Figure 2:
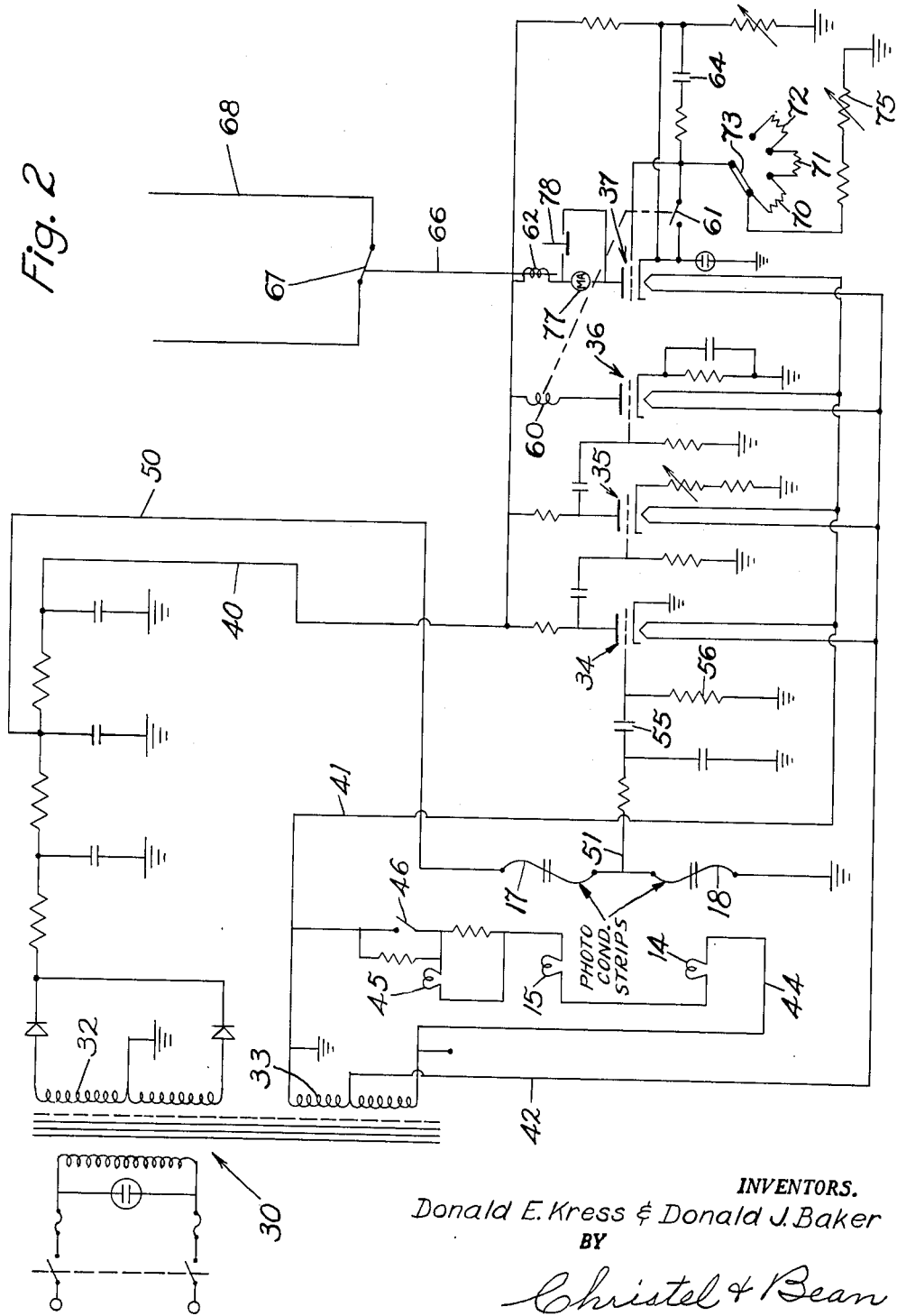

In the drawings:

FIG. 1 is a general perspective view of a pair of support members which define the rectangular photosensitive field in one form of the present invention; and FIG. 2 is a wiring diagram illustrating one form of electrical apparatus for carrying out the present invention.

Like characters of reference denote like parts and referring to FIG. 1, the numerals 10 and 11 designate a a pair of upright housings which are box-like in form and include a pair of facing surfaces designated 12 and 13, respectively.

A light source 14 is disposed within the upper end of housing 10 and a similar light source 15 is disposed within the lower end of housing 11. These light sources may comprise ordinary incandescent lamps and for present purposes may be considered to be point light sources.

The facing surfaces 12 and 13 of the housings 10 and 11 carry vertical elongated strips of photo-sensitive material designated 17 and 18 respectively, the specific nature of which will be described more fully below. The aforesaid facing surfaces of the housings 10 and 11 are further provided with rectangular vertically elongated apertures designated 19 and 20, respectively, which permit generally fan-shaped light ray patterns to emanate from the lamps 14 and 15, respectively, whereby fan-shaped or triangular light patterns pass across the space between the housings 10 and 11 and illuminate the strips 18 and 17, respectively.

In FIG. 1 the upper and lower boundaries of these fan-shaped or triangular light ray patterns, designated 21 and 22 respectively, are indicated in dot and dash lines. It will be noted that the two triangles of light rays thus formed overlap somewhat in the present instance, thus providing full light ray coverage of the rectangular area which they jointly define.

In the present embodiment the two strips 17 and 18 are connected electrically in series, as will be described more fully in conjunction with the wiring diagram, FIG. 2, and are of such nature that a decrease in the intensity of illumination anywhere along either of the strips increases the electrical resistance of the portion thus affected, whereby a resultant decrease in current flow through the strips is electrically detected and amplified to provide a useful output signal for various control purposes.

As an example of a suitable strip material, we have employed a cadmium selenide film by vacuum depositing the same on a dielectric substrate material which may comprimise a strip of glass. The glass strip with the deposited cadmium selenide may be mounted on an aluminum backing strip for structural reinforcement and the deposited film is preferably provided with a lacquer protective coating.

The photo-electric nature of cadmium selenide is such that when it is connected in an electrical circuit the resistance of any given portion of its length varies inversely with the degree or intensity of illumination of such portion. Thus the above-described photo-sensitive strips each act as an infinite number of resistors placed in series.

When the intensity of illumination of any portion of the strip is decreased, even though such portion be relatively short as compared with the full length of the strip, the resistance of that portion is substantially increased. This of couse has the effect of increasing the over-all resistance of the circuit. This increase in resistivity is such that a shadow on one of the sensitive strips which may be several hundred times smaller than the full area of the strip will cause a readily detectable change in electrical resistance of the strip as a whole.

For example, a 9-inch strip of the type described above may have a resistance when illuminated of approximately 5 megohms. Thus, if the strip be considered as 36 individual resistors comprising each quarter-inch of length of the strip, each quarter-inch would have a resistance of approximately 140K ohms. If a shadow is cast across one of these quarter-inch sections its resistance would be increased from 140K ohms to approximately 2.5 megohms. This would increase the total circuit resistance from 5 to approximately 7.5 megohms or about a 50% increase.

The manner in which the foregoing change in resistance is amplified and a typical instance of employing the amplified output signal in controlling the operation of machinery will now be described with particular reference to the wiring diagram, FIG. 2.

In FIG. 2 the numeral 30 refers generally to a power supply transformer including a pair of secondary windings 32 and 33. The numerals 34, 35 and 36 designate electronic tubes connected to provide three stages of amplification for the signal mentioned above, as will be more fully explained later herein, and the numeral 37 designates an electronic tube by means of which the output signal from the amplifying stages is employed in the present specific instance to directly accomplish a machine control function.

The secondary winding 32 supplies plate current for the several tubes 34 through 37 by way of a conductor 40 and secondary winding 33 energizes the filaments of the tubes 34 through 37 by way of conductors 41 and 42. Secondary winding 33 likewise energizes lamps 14 and 15 by way of a conductor 44. A small tell-tale lamp 45 is preferably provided and a manual switch 46 cuts off the major energizing circuit of lamps 14 and 15 when and if desired.

Energizing potential for the photo-sensitive strips 17 and 18 is derived from the secondary winding 32 by means of a conductor 50 which leads through the strips 17 and 18 in series and to ground. The midpoint between the strips 17 and 18 is tapped as at 51 to provide a signal input to the first amplifying stage, tube 34.

The resistances of the strips 17 and 18 form a voltage divider so that the potential of the grid input conductor 51 is substantially half of the potential applied to the two strips by way of conductor 50 when the strips have equal electrical resistance. It the resistance of the strip 17 increases due to a shadow thereon the voltage at the midpoint tap 51 will move closer to ground potential, that is, it will lower and direct a negative pulse toward the grid of the first amplifying tube 34. If the resistance of strip 18 increases due to a shadow thereon the voltage at the grid input conductor 51 will increase and deliver a positive pulse.

As it is necessary to have a positive pulse at the grid of the first amplifying tube, a capacitor 55 and a grounded resistance 56 form a differentiator which causes each of these positive or negative pulses to have both a positive and negative component and thus the bias of the grid varies in the same way in response to increased resistance of either of the two strips 17 and 18.

The output of the third amplifying stage, tube 36, energizes a relay winding 60 which controls contacts 61. It is to be understood that the varying output signal from tube 36 due to variations in the illumination of the strips 17 and 18 may be employed in various ways for controlling the operation of machinery or other apparatus with which the present detection means is associated. That is, variations in the plate output of tube 36 which controls relay winding 60 in the present instance may be employed in various control or indicating functions.

By way of example, the present instance exemplifies the use of the apparatus of the present invention in controlling the operation of power presses such as are used in stamping metal parts and the like. In press operation, if a stamped part is not discharged following each stamping cycle of the machine it indicates an abnormality. For instance, if the work piece remains in the die instead of being properly ejected, serious damage to the die may result.

Assuming that finished parts either fall through or are otherwise projected successively through the rectangular illuminated field defined by the triangles 21 and 22, in the present instance the electrical apparatus is so arranged that the press will be stopped unless successive parts pass through the field at time intervals determined by and adjusted to conform to the speed of operation of the press. The apparatus shown to the right of the third amplifying tube 36 in FIG. 2 provides a machine control operation of this type.

In normal operation passage of a part through the illuminated field once during each cycle of operation of the press will cause a momentary energization of the relay winding 60. Since the amplifier stages are A.C. coupled response to a shadow will be momentary even if the shadow remains. This momentarily closes relay contacts 61 which applies equal voltages to the grid and cathode of tube 37 which applies an energizing potential to relay winding 62 leading from the plate circuit of tube 37.

While the energization of winding 60 due to passage of a part through the illuminated field is momentary and the closing of switch 61 is accordingly likewise momentary, a capacitor 64 keeps the grid and cathode potential of tube 37 the same or nearly the same for a period of time sufficient to carry over to the point where another part is due to pass through the illuminated field and again momentarily energizes winding 60.

Thus, the ultimate control winding 62 is maintained in an energized condition and through its armature 66 holds a normally open switch 67 in a power press control circuit 68 in a circuit closing condition. If the succeeding energization of winding 60 does not take place due to failure of a succeeding part to pass through the sensitive field, the decay of the charge of the capacitor 64 will occur at about the time when such re-energization is due to occur, relay 62 will become de-energized and the press control circuit 68 will open. Since winding 62 is energized throughout the proper operation of the press, failure of winding 62 to be energized for any other reason will cause press stoppage, rendering the apparatus "fail-safe."

One or more of a series of fixed resistances 70, 71 and 72 are selectively includable in the grid circuit of tube 37 by means of a switch arm 73 to change the time delay period just described in fixed increments. A further variable adjustment of the time delay period is afforded by a variable resistor 75 likewise included in the grid circuit of tube 37. In FIG. 2 the numeral 77 designates a milliammeter whereby the current in control relay 62 may be calibrated by manually opening a normally closed switch 78 which is connected about the milliammeter.

The foregoing system of detecting the timed recurrence of passing objects may be used for other purposes where it is desired to detect the failure of an event to occur, such as when a series of bottles are moving along a conveyor and one of the bottles is tipped over or missing.

The facing surfaces 12 and 13 of housings 10 and 11 may be provided with light filtering sheets to overly the apertures 19 and 20 and the strips 17 and 18 to render the apparatus sensitive primarily to light in the infrared or near infra-red range. This decreases the effects of ambient or stray light on the instrument. In any event, because of the series connection and midpoint tapping of the strips ambient light falling on both strips tends to cancel out and produce substantially no output signal.

Since the change of resistance of a strip is proportionate to the length of strip which is darkened, the apparatus may readily be used to detect or sense the size of objects passing through the field, as for instance objects moving along at uniform velocity and in a constant position as on a conveyor.

We claim:
1. Photo-electric apparatus for detecting the presence of an object at any point in a generally rectangular field comprising a pair of elongated strips of electrically conductive material having conductivity proportional to the degree of illumination thereof extending along two opposite sides of said rectangular field, circuit means connected to opposite ends of said strips to include said strips as conductors therein to provide an output signal inversely proportionate to the electrical resistance of said strips under various degrees of illumination, means for amplifying said output signal, means for directing light rays across substantially the entire area of said rectangular field to one or the other of said strips, said light directing means comprising a pair of lamps at diagonally opposite corners of said rectangular field each adjacent to an end of one of said strips, and housing means for said lamps having openings for radiation of light from each lamp toward the strip at the opposite side of said field in a triangular pattern whereby the two triangles of light rays thus radiated substantially blanket said rectangular field.

2. Photo-electric apparatus for detecting the presence of an object at any point in a generally rectangular field comprising a pair of elongated strips of material having electrical conductivity proportional to the degree of illumination thereof extending along two opposite sides of said rectangular field, circuit means connected to opposite ends of said strips to include said strips as conductors therein to provide an output signal inversely proportionate to the electrical resistance of said strips under various degrees of illumination, a pair of lamps at diagonally opposite corners of said rectangular field each adjacent to an end of one of said strips and means for directing light from each lamp toward the strip at the opposite side of said field in a triangular pattern whereby the two triangles of light rays thus radiated substantially blanket said rectangular field.

3. Photo-electric apparatus for detecting the presence of an object at any point in a generally rectangular field comprising relatively elongated light sensitive means extending along two opposite sides of said rectangular field, circuit means connected to opposite ends of said light sensitive means for producing an output signal varying in response to a variation in illumination along any portion of either of said elongated light sensitive means, means for directing light rays across substantially the entire area of said rectangular field to one or the other of said elongated light sensitive means, said light directing means comprising a pair of light sources at diagonally opposite corners of said rectangular field each adjacent to an end of one of said elongated light sensitive means and means for directing light from each source toward the light sensitive means at the opposite side of said field in a triangular pattern whereby the two triangles of light rays thus radiated substantially blanket said rectangular field.

4. A photo-sensitive control and indicating apparatus operable to detect the absence of one of a series of regularly spaced passing objects, said apparatus comprising light means and spaced light sensitive means normally illuminated thereby, said series of objects passing successively between said light means and said light sensitive means and periodically momentarily darkening the light sensitive means as objects pass between the same and the light means, an output pulse signal emanating from said light sensitive means as said light sensitive means is darkened, time delay circuit means receiving said pulse signal and maintaining the same for a time period substantially equal to the normal time between the passage of successive objects of said series whereby said signal is rendered substantially constant and continuous by the continued passage of objects in said series but is interrupted by the absence of an object upon termination of the preceding time delay period, and indicating means responsive to such interruption of said output pulse signal.

5. Apparatus according to claim 4 including means for adjusting the time delay period of said time delay circuit means.

References Cited by the Examiner

UNITED STATES PATENTS

| | | | |
|---|---|---|---|
| 1,995,881 | 3/1935 | Cockrell et al. | 250—221 X |
| 2,048,740 | 7/1936 | Geffcken et al. | 250—224 X |
| 2,300,613 | 11/1942 | Colle | 250—215 X |
| 2,595,993 | 5/1952 | Templeman et al. | 250—221 X |
| 2,803,754 | 8/1957 | Cox | 250—228 X |
| 3,036,219 | 5/1962 | Thompson | 250—211 X |
| 3,065,356 | 11/1962 | Blake et al. | 250—219 |

RALPH G. NILSON, *Primary Examiner.*

WALTER STOLWEIN, *Examiner.*